United States Patent
Baumgart et al.

(10) Patent No.: US 7,129,280 B2
(45) Date of Patent: Oct. 31, 2006

(54) MIXTURES WHICH CONTAIN CARBAMATE GROUPS AND/OR ALLOPHANATE GROUPS AND CAN BE CURED THERMALLY AND BY USING ACTINIC RADIATION

(75) Inventors: Hubert Baumgart, Münster (DE); Sandra Hasse, Drensteinfurt (DE); Uwe Meisenburg, Duisburg (DE); Vincent Cook, Münster (DE)

(73) Assignee: BASF Coatings AG, Munster (DE)

( * ) Notice: Subject to any disclaimer, the term of this patent is extended or adjusted under 35 U.S.C. 154(b) by 357 days.

(21) Appl. No.: 10/473,728

(22) PCT Filed: Jun. 18, 2002

(86) PCT No.: PCT/EP02/06703

§ 371 (c)(1),
(2), (4) Date: Oct. 1, 2003

(87) PCT Pub. No.: WO03/000813

PCT Pub. Date: Jan. 3, 2003

(65) Prior Publication Data

US 2004/0068025 A1   Apr. 8, 2004

(30) Foreign Application Priority Data

Jun. 21, 2001   (DE) ................. 101 29 969

(51) Int. Cl.
*C08K 5/205* (2006.01)
*C08K 5/21* (2006.01)
*C08J 3/28* (2006.01)

(52) U.S. Cl. .................. 522/152; 522/90; 522/96; 522/173; 522/170; 522/174; 522/182; 522/100; 522/104; 522/97; 522/150; 522/163; 522/164; 522/165; 427/411.1; 427/423.1; 427/508; 427/512; 427/513; 524/211; 524/212; 524/213; 524/507

(58) Field of Classification Search ................. 522/96, 522/173, 170, 174, 182, 90, 100, 104, 97, 522/150, 151, 152, 163, 164, 165; 428/411.1, 428/423.1; 427/508, 512, 513, 518; 524/211, 524/212, 213, 507

See application file for complete search history.

(56) References Cited

U.S. PATENT DOCUMENTS

| | | | |
|---|---|---|---|
| 5,356,669 A | 10/1994 | Rehfuss et al. | 427/407.1 |
| 5,412,049 A | 5/1995 | Argyropoulos et al. | 526/312 |
| 5,512,639 A | 4/1996 | Rehfuss et al. | 525/456 |
| 5,744,550 A | 4/1998 | Menovcik et al. | 525/162 |
| 5,866,259 A | 2/1999 | Harris et al. | 428/424.4 |
| 6,235,858 B1 | 5/2001 | Swarup et al. | |
| 6,288,974 B1 | 9/2001 | Nelson | 367/135 |
| 6,624,280 B1 | 9/2003 | Rink et al. | 528/59 |
| 2003/0091833 A1 | 5/2003 | Frieling et al. | 524/589 |
| 2003/0180539 A1 | 9/2003 | Rockrath et al. | 428/411.1 |

FOREIGN PATENT DOCUMENTS

| | | |
|---|---|---|
| EP | 594 142 | 10/1993 |
| EP | 889 103 | 8/1998 |
| WO | WO87/00851 | 2/1987 |
| WO | WO01/23484 | 4/2001 |
| WO | WO01/46285 | 6/2001 |
| WO | WO02/090414 | 11/2002 |

OTHER PUBLICATIONS

D. Campbell, et al., U.S. Appl. No. 09/890,760, filed Aug. 2, 2001.
Baumgart, et al., U.S. Appl. No. 09/919,588, filed Aug. 14, 2001.
Sabine, et al. U.S. Appl. No. 10/070,785, filed Mar. 12, 2002.
English Translation of WO02/090414 filed Sep. 30, 2003.

*Primary Examiner*—Sanza L. McClendon

(57) ABSTRACT

Mixtures curable thermally and with actinic radiation and containing carbamate and/or allophanate groups, comprising (A) at least one of
(A1) low molecular mass compounds, oligomers and polymers containing allophanate groups, carbamate groups, and carbamate and allophanate groups, and
(A2) low molecular mass compounds, oligomers and polymers containing allophanate groups, carbamate groups, and carbamate and allophanate groups, and additionally allophanate- and/or carbamate-reactive functional groups,
which are substantially or entirely free from reactive functional groups which contain at least one bond which can be activated with actinic radiation, and
(C) at least one constituent containing on average per molecule at least one reactive functional group having at least one bond which can be activated with actinic radiation; with the proviso that if only (A1) is used, the mixtures further comprise
(B) at least one of low molecular mass compounds, oligomers and polymers containing allophanate- and/or carbamate-reactive functional groups.

19 Claims, No Drawings

MIXTURES WHICH CONTAIN CARBAMATE GROUPS AND/OR ALLOPHANATE GROUPS AND CAN BE CURED THERMALLY AND BY USING ACTINIC RADIATION

CROSS REFERENCE TO RELATED APPLICATIONS

This application is a National Phase Application of Patent Application PCT/EP02/06703 filed on 18 Jun. 2002, which claims priority to DE 101 29 969.9, filed on 21 Jun. 2001.

The invention relates to novel mixtures containing carbamate and/or allophanate groups, which are curable thermally and with actinic radiation. The present invention additionally relates to processes for preparing the novel mixtures containing carbamate and/or allophanate groups and curable thermally and with actinic radiation. The present invention also relates to the use of the novel mixtures containing carbamate and/or allophanate groups and curable thermally and with actinic radiation as, or to prepare, coating materials, adhesives and sealing compounds. The present invention relates in particular to the use of the novel coating materials containing carbamate and/or allophanate groups and curable thermally and with actinic radiation as clearcoat materials, in particular for producing clearcoats as part of multicoat color and/or effect paint systems.

Actinic radiation hereinbelow means electromagnetic radiation, such as near infrared, visible light, UV radiation or X-rays, especially UV radiation, and corpuscular radiation, such as electron beams.

Combined curing by means of heat and actinic radiation is known to those skilled in the art as dual cure. Accordingly, the novel mixtures, coating materials, adhesives and sealing compounds under discussion are referred to as dual-cure mixtures, coating materials, adhesives and sealing compounds.

Thermally curable coating materials comprising constituents containing allophanate groups are known from the German patent application DE 198 39 453 A 1. These coating materials are capable of wide application and are outstandingly suitable for the wet-on-wet technique for producing multicoat color and/or effect paint systems. The paint systems produced from the coating materials are highly compatible with other coating systems and are scratch-resistant and weathering-stable. The dual-cure crosslinking of these coating materials is not described.

Thermally curable coating materials comprising low molecular mass compounds, oligomers and/or polymers containing carbamate groups are known from the patent applications EP 0 710 707 A 2, WO 87/00851, EP 0 594 068 A 1, EP 0 594 142 A 1, WO 94/10211 and DE 199 46 048 A 1 or from the patent EP 0 636 660 B1. The coatings produced from the known coating materials are notable for high etch resistance and chemical resistance. The dual-cure crosslinking of these coating materials is not described in the literature.

The German patent application DE 199 61 926.3, unpublished at the priority date of the present specification, describes dual-cure mixtures which are curable thermally and with actinic radiation and comprise at least one constituent containing on average per molecule at least one primary or secondary carbamate group and at least one bond which can be activated with actinic radiation, and at least one constituent containing on average per molecule at least one carbamate-reactive functional group and also, where appropriate, at least one bond which can be activated with actinic radiation.

Besides the customary and known crosslinking agents, the known dual-cure mixtures may include reactive diluents which can be cured with actinic radiation, such as difunctional or higher polyfunctional (meth)acrylates such as trimethylolpropane tri(meth)acrylate. These additives are to be selected from a long list of suitable additives. The dual-cure mixtures may be used as coating materials, adhesives and sealing compounds.

The German patent application DE 100 42 152.0, unpublished at the priority date of the present specification, describes Theological aids which can be activated with actinic radiation and possess pseudoplastic properties. They are prepared by reacting a monoamine, such as benzylamine, with a polyisocyanate, such as hexamethylene diisocyanate, in the presence of a compound containing at least one functional group having at least one bond which can be activated with actinic radiation, such as dipentaerythritol pentaacrylate. The rheological aids formed from urea derivative and dipentaerythritol pentaacrylate are used to prepare dual-cure coating materials.

The dual-cure coating materials may comprise binders containing allophanate and/or carbamate groups and also, where appropriate, functional groups having at least one bond which can be activated with actinic radiation, such as acrylate groups. Moreover, they may comprise amino resin crosslinking agents. Furthermore, they may also include customary and known binders curable with actinic radiation alone, such as (meth)acryloyl-functional (meth)acrylate copolymers, polyether acrylates, polyester acrylates, unsaturated polyesters, epoxy acrylates, urethane acrylates, amino acrylates, melamine acrylates, silicone acrylates, and the corresponding methacrylates, and customary and known reactive diluents curable with actinic radiation, having a functionality of up to four and being described in Römpp Lexikon Lacke und Druckfarben, Georg Thieme Verlag, Stuttgart, New York, 1998, "reactive diluents", pages 491 and 492, such as pentaerythritol tetraacrylate, for example. The binders, the crosslinking agents, the thermally crosslinking complementary reactive functional groups, the binders curable with actinic radiation alone, and the reactive diluents curable with actinic radiation are to be selected from a plurality of lists, as a result of which numerous possibilities exist for combination. The examples and the description reveal that it is primarily hydroxyl-containing binders and isocyanato-containing crosslinking agents that are used.

The heat-curable coating materials, adhesives and sealing compounds known to date and containing carbamate groups and/or allophanate groups, especially the clearcoat materials, have a number of technical advantages, which ought to be retained in the course of their further development. Despite the high technological level attained, the coatings, adhesive films and seals produced from the existing heat-curable coating materials, adhesives and sealing compounds containing carbamate groups and/or allophanate groups still leave something to be desired in terms of their scratch resistance and their reflow characteristics. Moreover, they cannot be additionally cured with actinic radiation.

It is an object of the present invention to provide novel dual-cure mixtures curable thermally and with actinic radiation and containing carbamate and/or allophanate groups, which can be used as dual-cure coating materials, adhesives and sealing compounds and which achieve the high technological level of the prior art, if not indeed exceeding it. Furthermore, the novel coating materials, adhesives and sealing compounds curable thermally and with actinic radiation and containing carbamate and/or allophanate groups should give coatings, adhesive films and seals which attain the high technological level of the prior art, if not indeed exceeding it, and at the same time possess high scratch resistance and very good reflow characteristics. They should exhibit a good profile of performance properties, especially as regards scratch resistance and chemical resistance, on and in three-dimensional substrates of complex shape, especially in continuous operation, even under conditions of suboptimum—in particular, incomplete—illumination of the shadow zones with actinic radiation, thereby allowing the apparatus and measurement and control technology associated with actinic radiation curing to be simplified and the process time to be shortened.

The present invention accordingly provides the novel dual-cure mixtures curable thermally and with actinic radiation and containing carbamate and/or allophanate groups, comprising (A) at least one constituent selected from the group consisting of
  (A1) low molecular mass compounds, oligomers and polymers containing allophanate groups, carbamate groups, and carbamate and allophanate groups, and
  (A2) low molecular mass compounds, oligomers and polymers containing allophanate groups, carbamate groups, and carbamate and allophanate groups, and additionally allophanate- and/or carbamate-reactive functional groups,
  which are substantially or entirely free from reactive functional groups which contain at least one bond which can be activated with actinic radiation,
(C) at least one constituent containing on average per molecule at least one reactive functional group having at least one bond which can be activated with actinic radiation;

with the proviso that the dual-cure mixtures further comprise
(B) at least one constituent selected from the group consisting of low molecular mass compounds, oligomers and polymers containing allophanate- and/or carbamate-reactive functional groups, if exclusively the constituents (A1) are used.

From the text below, the novel dual-cure mixtures curable thermally and with actinic radiation and containing carbamate and/or allophanate groups are referred to as "dual-cure mixtures of the invention".

Further subject matters, processes and uses of the invention will emerge from the description.

In the light of the prior art it was surprising and unforeseeable for the skilled worker that the object on which the present invention was based could be achieved by means of the dual-cure mixture of the invention.

A particular surprise was that the coatings, adhesives and seals, especially coatings, produced from the dual-cure mixtures of the invention combined a high level of hardness with high scratch resistance and very good reflow characteristics, since hardness and scratch resistance frequently are mutually contradictory parameters.

Not least was it surprising that the dual-cure coating materials, adhesives and sealing compounds of the invention gave coatings, adhesive films and seals which possessed a good profile of performance properties especially as regards scratch resistance and chemical resistance, on and in three-dimensional substrates of complex shape, in the shadow zones in continuous operation, even under conditions of suboptimum, especially incomplete, illumination of the shadow zones with actinic radiation, thereby allowing the apparatus and measurement and control technology associated with actinic radiation curing to be simplified and the process time to be shortened.

Here and below, polymers are understood to be substances containing on average per molecule at least 10 monomer units. Oligomers are understood to be substances containing on average per molecule from 3 to 15 monomer units. For further details of these terms, refer to Römpp Lexikon Lacke und Druckfarben, Georg Thieme Verlag, Stuttgart, New York, 1998, "oligomers", page 425.

The dual-cure mixtures of the invention comprise at least one low molecular mass compound, oligomer and/or polymer (A) selected from the group consisting of low molecular mass compounds, oligomers and polymers which contain allophanate groups, carbamate groups, or allophanate groups and carbamate groups and which are substantially or entirely free from reactive functional groups containing at least one bond which can be activated with actinic radiation.

"Substantially free from reactive functional groups" means that the constituents (A) may contain a small amount of such reactive functional groups, originating for example from the preparation method of the components (A), the amount in question being, however, insignificant as far as crosslinking is concerned.

Preference is given to using the oligomers and/or polymers (A), which are also referred to as binders.

The allophanate oligomers and/or polymers (A) contain on average per molecule at least one allophanate group and preferably at least two, with particular preference at least three, and in particular at least four, allophanate groups.

The allophanate and carbamate oligomers and/or polymers (A) contain on average per molecule at least one allophanate group and at least one carbamate group and also preferably at least two, with particular preference at least three, and in particular at least four, allophanate groups and at least one carbamate group, in particular at least two carbamate groups.

The carbamate oligomers and/or polymers (A) contain on average per molecule preferably at least one carbamate group and more preferably at least two, with particular preference at least three, and in particular at least four, carbamate groups.

The amount of the constituents (A) in the dual-cure mixtures of the invention may vary very widely and is guided by the requirements of the respective intended use. Preferably, the dual-cure mixtures of the invention contain the constituents (A) in an amount, based in each case on the solids of the dual-cure mixture of the invention, of from 10 to 90%, more preferably from 12 to 85%, with particular preference from 14 to 80%, with very particular preference from 16 to 75%, and in particular from 18 to 75% by weight.

Hereinbelow, solids means the sum of those constituents of the respective dual-cure mixture of the invention which, following the heat cure, constitute the coatings, adhesive films or seals.

The dual-cure mixtures of the invention further comprise at least one constituent (B) selected from the group consisting of low molecular mass compounds, oligomers and polymers containing allophanate- and/or carbamate-reactive functional groups. Preference is given to using the low molecular mass compounds (B), which are also referred to as crosslinking agents. The crosslinking agents (B) are employed when the constituents (A) contain no carbamate- and/or allophanate-reactive functional groups, i.e., are not self-crosslinking.

The amount of the crosslinking agents (B) in the dual-cure mixtures of the invention may likewise vary widely. The amount is preferably from 5 to 40%, more preferably from 6 to 35%, with particular preference from 7 to 30%, with very particular preference from 8 to 25%, and in particular from 9 to 20% by weight, based in each case on the solids of the dual-cure mixture of the invention. In this context it is further advisable to choose the amounts of crosslinking agent (B) and low molecular mass compounds, oligomers and/or polymers (A1) in such a way that in the dual-cure mixtures of the invention the ratio of complementary reactive functional groups in the crosslinking agent (B) to reactive functional groups in the constituents (A1) is from 2:1 to 1:2, preferably from 1.5:1 to 1:1.5, with particular preference from 1.2:1 to 1:1.2, and in particular from 1.1:1 to 1:1.1. Similar comments apply to the self-crosslinking binders (A2) and to the mixtures of binders (A1) and (A2) and crosslinking agents (B).

Furthermore, the dual-cure mixtures of the invention comprise at least one constituent (C) which contains on average per molecule at least one reactive functional group having at least one bond which can be activated with actinic radiation. Furthermore, the constituent (C) may also include at least one allophanate- and/or carbamate-reactive functional group.

The amount of the constituents (C) in the dual-cure mixtures of the invention may likewise vary widely. Preferably the amount is from 5 to 50%, more preferably from 6 to 45%, with particular preference from 7 to 40%, with very particular preference from 8 to 35%, and in particular from 9 to 30% by weight, based in each case on the solids of the dual-cure mixture of the invention.

Over and above this, the dual-cure mixtures of the invention may also comprise at least one rheological aid (D) having pseudoplastic properties. The Theological aid (D) is preferably selected from the group consisting of urea derivatives and silicas.

The amount of the Theological aids (D) in the dual-cure mixtures of the invention may vary very widely. The dual-cure mixtures of the invention preferably contain the rheological aids (D) in an amount, based in each case on the solids of the dual-cure mixture of the invention, of from 0.1 to 10%, more preferably from 0.2 to 9%, with particular preference from 0.3 to 8%, with very particular preference from 0.4 to 7%, and in particular from 0.5 to 6% by weight.

The dual-cure mixtures of the invention may further comprise at least one wetting agent (E).

Where used, the wetting agents (E) are present in the dual-cure mixtures of the invention in an amount, based in each case on the solids of the dual-cure mixture of the invention, of preferably from 0.01 to 5%, more preferably from 0.02 to 4%, with particular preference from 0.03 to 3%, with very particular preference from 0.04 to 2%, and in particular from 0.05 to 1% by weight.

Additionally, the dual-cure mixtures of the invention may further comprise customary and known pigments (F) and/or additives (G).

Examples of suitable low molecular mass compounds (A) are described in detail in the literature
EP 0 710 707 A 2, page 4 lines 1 to 27, or EP 0 915 113 A 1, page 2 lines 44 to 48 and page 6 lines 21 to 25,
EP 0 636 660 B 1, column 1 line 41 to column 2 line 3, column 2 line 12 to column 3 line 32, and column 5 line 43 to column 6 line 36, or WO 87/00851, page 13 line 11 to page 15 line 8 and example 1 to example 33, pages 17 to 27.

These low molecular mass compounds (A) permit the preparation of particularly high-solids compositions of the invention.

Suitable binders (A) come from the polymer classes of the random, alternating and/or block, linear and/or branched and/or comb, addition (co)polymers of ethylenically unsaturated monomers, or polyaddition resins and/or polycondensation resins. For further details on these terms, refer to Römpp Lexikon Lacke und Druckfarben, Georg Thieme Verlag, Stuttgart, New York, 1998, page 457, "polyaddition" and "polyaddition resins (polyadducts)", and also pages 463 and 464, "polycondensates", "polycondensation" and "polycondensation resins".

Examples of highly suitable addition (co)polymers (A) are (meth)acrylate copolymers and particularly saponified polyvinyl esters, especially (meth)acrylate copolymers.

Examples of highly suitable polyaddition resins and/or polycondensation resins (A) are polyesters, alkyds, polyurethanes, polylactones, polycarbonates, polyethers, epoxy resin-amine adducts, polyureas, polyamides or polyimides, especially polyesters.

With very particular preference, the oligomers and/or polymers (A) come from the polymer classes of the (meth)acrylate copolymers and polyesters.

Oligomers and polymers (A) that contain allophanate groups and come from the abovementioned polymer classes are known from the German patent application DE 198 39 453 A 1, page 2 line 65 to page 6 line 34 and page 7 lines 25 to 53.

Oligomers and polymers (A) that contain carbamate groups and come from the abovementioned polymer classes, and processes for preparing them, are known from the patent applications
EP 0 594 068 A 1, page 2 line 45 to page 4 line 27, page 5 lines 36 to 57 and page 7 lines 1 to 22,
EP 0 594 142 A 1, page 3 line 1 to page 4 line 37, page 5 line 49 to page 6 line 12 and page 7 lines 5 to 26,
WO 94/10211, page 4 line 18 to page 8 line 8, page 12 line 30 to page 14 line 36, page 15 line 35 to page 17 line 32 and page 18 line 16 to page 19 line 30, and
DE 199 46 048 A 1.

The oligomers and/or polymers (A) are preferably prepared by copolymerizing a monomer mixture containing at least one olefinically unsaturated carboxylic acid, methacrylic acid for example, in the presence of a glycidyl ester of Versatic® acid (see Römpp Lexikon Lacke und Druckfarben, Georg Thieme Verlag, Stuttgart New York, 1998 "Versatic® acids", pages 605 and 606) and then reacting the resultant hydroxyl-containing (meth)acrylate copolymer with at least one alkyl carbamate, such as methyl, propyl or butyl carbamate. Or else hydroxyl-containing (meth)acrylate copolymers are converted using phosgene into (meth)acrylate copolymers containing chloroformate groups, after which the chloroformate groups are converted into carbamate groups using ammonia or primary amines. It is also possible to react isocyanato-containing (meth)acrylate copolymers or polyesters with at least one hydroxylalkyl carbamate, such as 2-hydroxyethyl carbamate.

The oligomers and polymers (A) preferably have a number-average molecular weight of from 600 to 20,000, more preferably from 800 to 15,000, with particular preference from 1,000 to 10,000, with very particular preference from 1,200 to 8,000, and in particular from 1,200 to 6,000 daltons.

Besides the allophanate and/or carbamate groups, the constituents (A), especially the oligomers and/or polymers (A), may also contain at least one functional group selected from the group consisting of (i) allophanate- and carbamate-reactive functional groups,
(ii) dispersing groups by means of which the oligomers and/or polymers (A) are rendered soluble or dispersible in water.

Examples of suitable allophanate- and/or carbamate-reactive functional groups (i) are N-methylol groups and N-methylol ether groups, preferably the methyl, ethyl, n-propyl and/or n-butyl ethers. The constituents (A2) in question, especially the oligomers and/or polymers (A2), are in that case partially or fully self-crosslinking, and so in this case it is possible substantially or entirely to forgo the use of crosslinking agents (B).

Examples of suitable dispersing groups (ii) are anion-forming groups, such as carboxylic acid, sulfonic acid or phosphonic acid groups, or anionic groups, such as carboxylate, sulfonate or phosphonate groups, cation-forming groups, such as primary, secondary or tertiary amino groups, or cationic groups, examples being ammonium groups, such as primary, secondary, tertiary or quaternary ammonium groups, sulfonium groups and phosphonium groups, or polyalkylene oxide groups, such as polyethylene oxide groups, which may be incorporated laterally, terminally and/or chain-internally into the oligomers and polymers (A) (cf. Römpp Lexikon Lacke und Druckfarben, Georg Thieme Verlag, Stuttgart, New York, 1998, "water-dispersible binders" page 619, and "water-soluble binders", pages 626 and 625).

The preparation of the oligomers and/or polymers (A) containing the above-described groups (i) and/or (ii) also has no special features in terms of its method but instead takes place with the aid of the methods and the apparatus which are known from the patent applications cited above or are described in the German patent application DE 199 61 926.3, unpublished at the priority date of the present specification.

Accordingly, for example, groups (i) may be introduced by the copolymerization of olefinically unsaturated monomers containing N-methylol ether groups or by polymer-analogous reactions of lateral and/or terminal amino groups with formaldehyde.

Groups (ii) may be incorporated, for example, by copolymerization of olefinically unsaturated carboxylic acids, such as acrylic acid or methacrylic acid or via the polymer-analogous reaction of hydroxyl groups with carboxylic anhydrides, such as maleic anhydride or phthalic anhydride.

Suitable crosslinking agents (B) are amino resins.

Suitable amino resins include in principle all formaldehyde-containing resins such as are commonly used as crosslinking agents in the field of coating materials, adhesives and sealing compounds. Preference is given to using melamine resins.

Examples of suitable amino resins are described in Römpp Lexikon Lacke und Druckfarben, Georg Thieme Verlag, 1998, page 29, "amino resins", in the textbook "Lackadditive" [Additives for coatings] by Johan Bieleman, Wiley-VCH, Weinheim, N.Y., 1998, pages 242 ff., in the book "Paints, Coatings and Solvents", second, completely revised edition, edited by D. Stoye and W. Freitag, Wiley-VCH, Weinheim, N.Y., 1998, pages 80 ff., in the American patent U.S. Pat. No. 4,710,542 A or in the patent applications EP 0 245 700 A 1 and WO 00/37520, page 3 lines 1 to 13, and also in the article by B. Singh and coworkers, "Carbamylmethylated Melamines, Novel Crosslinkers for the Coatings Industry", in Advanced Organic Coatings Science and Technology Series, 1991, Volume 13, pages 193 to 207.

The constituents (C) curable with actinic radiation contain on average per molecule at least one reactive functional group, preferably at least two, with particular preference at least three, and in particular three, reactive functional groups which contain(s) at least one, especially one, bond which can be activated with actinic radiation.

Furthermore, the constituents (C) may contain at least one of the above-described allophanate- and/or carbamate-reactive functional groups.

Examples of suitable bonds which can be activated with actinic radiation are carbon-hydrogen single bonds or carbon-carbon, carbon-oxygen, carbon-nitrogen, carbon-phosphorus or carbon-silicon single bonds or double bonds. Of these, the double bonds, especially the carbon-carbon double bonds (referred to as "double bonds" below), are employed with preference.

Highly suitable double bonds are present, for example, in (meth)acrylate, ethacrylate, crotonate, cinnamate, vinyl ether, vinyl ester, ethenylarylene, dicyclopentadienyl, norbornenyl, isoprenyl, isopropenyl, allyl or butenyl groups; ethenylarylene ether, dicyclopentadienyl ether, norbornenyl ether, isoprenyl ether, isopropenyl ether, allyl ether or butenyl ether groups; or ethenylarylene ester, dicyclopentadienyl ester, norbornenyl ester, isoprenyl ester, isopropenyl ester, allyl ester or butenyl ester groups. Of these, (meth)acrylate groups, especially acrylate groups, are of particular advantage and are therefore used with very particular preference in accordance with the invention.

The parent structure to which the double bonds are attached is not critical; rather, it is possible to make use, for example, of polymers and/or oligomers which come from the polymer classes described above in connection with the binders (A). The double bonds may be incorporated in the customary and known manner by way of polymer-analogous reactions of lateral and/or terminal hydroxyl groups with olefinically unsaturated monoisocyanates, such as vinyl isocyanate, methacryloyl isocyanate or 1-(1-isocyanato-1-methylethyl)-3-(1-methylethenyl) benzene (TMI® from CYTEC), of lateral and/or terminal isocyanate groups with hydroxyl-containing, olefinically unsaturated monomers such as hydroxyethyl, acrylate, or of lateral and/or terminal epoxide groups with olefinically unsaturated carboxylic acids, such as acrylic acid or methacrylic acid.

Examples of suitable constituents (C), containing up to four double bonds, are described in Römpp Lexikon Lacke und Druckfarben, Georg Thieme Verlag, Stuttgart, New York, 1998, "reactive diluents", pages 491 and 492, or in the German patent application DE 198 18 735 A 1, column 7 lines 1 to 25.

Examples of suitable constituents (C) containing six or more double bonds in the molecule are (meth)acryloyl-functional (meth)acrylic copolymers, polyether acrylates, polyester acrylates, unsaturated polyesters, epoxy acrylates, urethane acrylates, amino acrylates, acrylated amino resins, such as melamine acrylates, silicone acrylates and the corresponding methacrylates. Of these, the urethane (meth)acrylates (C) are advantageous and are therefore used with particular preference.

The urethane (meth)acrylates (C) and processes for preparing them are known, for example, from the patent applications and patents EP 0 204 161 A 1, DE 196 45 761 A 1, WO 98/10028, EP 0 742 239 A 1, EP 0 661 321 B 1, EP 0 608 021 B 1, EP 0 447 998 B 1, or EP 0 462 287 B 1. The urethane (meth)acrylates (C) are commercially customary products and are sold, for example, under the brand name Ebecryl® 1290 by UCB, Belgium, or under the brand name Rahn® 99–664 by Rahn.

Further examples of suitable constituents (C) are known from the German patent application DE 198 18 735 A 1, column 2 lines 24 to 36, column 3 line 16 to column 6 line 33 and column 6 lines 34 to 68. Highly suitable examples are pentaerythritol triacrylate, which is sold under the brand name Sartomer® 444 D by Cray Valley, France, and dipentaerythritol pentaacrylate, which is sold by the same company under the brand name Sartomer® 399.

The rheological aids (D) are selected from the group consisting of urea derivatives and silicas.

Suitable Theological aids (D) are known, for example, from the literature EP 0 192 304 A 1, DE 23 59 923 A 1, DE 18 05 693 A 1, WO 94/22968, DE 27 51 761 C 2, WO 97/12945 and "farbe+lack", 11/1992, pages 829 ff., WO 00/31194, WO 00/37520, DE 199 24 172 A 1, DE 199 24 171 A 1 or DE 199 24 170 A 1.

It is preferred to use rheological aids (D) which are preparable by reacting at least one amine and/or water with at least one isocyanate in the presence of at least one amino resin and/or at least one of the above-described oligomers and/or polymers (A). They are preferably prepared using the amines.

The amines preferably selected from the group consisting of acyclic aliphatic, aliphatic-aromatic, cycloaliphatic, aliphatic-cycloaliphatic and cycloaliphatic-aromatic primary and secondary monoamines and polyamines.

Examples of suitable monoamines are known from the German patent applications DE 199 24 172 A 1, page 3 lines 3 to 10, and DE 199 24 171 A 1, page 3 lines 35 to 42, or from the international patent applications WO 00/31194, page 11 lines 14 to 29, and WO 00/37520, page 3 line 15 to page 4 line 5. Particular preference is given to using methoxypropylamine, benzylamine and/or n-hexylamine.

The polyamines contain on average per molecule at least two primary and/or secondary amino groups. Examples of suitable polyamines are known from the international patent application WO 00/37520, page 4 lines 6 to 19.

Suitable isocyanates include monoisocyanates and polyisocyanates. The monoisocyanates are used for the reaction with polyamines and the polyisocyanates for the reaction with the monoamines. Preferably the polyisocyanates and the monoamines are used to prepare the Theological aids (D).

Examples of suitable monoisocyanates are known from the international patent application WO 00/37520, page 4 line 21 to page 5 line 2.

Preference is given to using polyisocyanates containing on average per molecule at least 1.8, more preferably at least 2, and in particular 2, isocyanate groups. Examples of suitable polyisocyanates and diisocyanates are described in detail in the international patent applications WO 00/31194, page 11 line 30 to page 12 line 26, and WO 00/37520, page 5 line 4 to page 6 line 27, or from the German patent applications DE 199 24 172 A 1, page 3 lines 11 to 23, DE 199 24 170 A 1, column 3 line 61 to column 6 line 68, and DE 199 24 171 A 1, page 3 line 43 to page 5 line 34. Particular preference is given to using hexamethylene diisocyanate and its oligomers, especially trimers.

Suitable amino resins include in principle all formaldehyde-containing resins such as are commonly used as crosslinking agents (B) in the field of coating materials, adhesives and sealing compounds. It is preferred to use melamine resins. The amount of amino resins introduced into the dual-cure mixtures of the invention by the rheological aids (D) is included in the amount of crosslinking agents (B) in said mixtures.

Suitable oligomers and polymers (A) are those described above. The amount of constituents (A) introduced into the dual-cure mixtures of the invention by the Theological aids (D) is included in the amount of binders (A) in said mixtures.

The reaction of the amines or of water, especially of the amines, with the isocyanates in the presence of the amino resins has no special features in terms of its method but instead takes place as described in the international patent application WO 00/37520, page 6 line 29 to page 8 line 14 and page 9 line 28 to page 10 line 32.

The reaction of the amines or of water, especially of the amines, with the isocyanates in the presence of the oligomers and/or polymers (A) likewise has no special features in terms of its method but instead takes place as described in the international patent application WO 00/31194, page 12 line 23 to page 13 line 19.

For the preparation of the urea derivatives (D) on the tonne scale, the continuous process known from the German patent application DE 199 03 283 A 1, in which an inline dissolver is used as the mixing unit, is advantageous. In this case the weight ratio of amino resin and/or oligomer and/or polymer (A) to rheological aid (D) may be 100:1, preferably 90:1, more preferably 80:1, with particular preference 70:1, with very particular preference 60:1, and in particular 50:1.

Amino resins (B) comprising Theological aids (D) prepared in this way are customary and known and are sold, for example, under the brand name Setamine® XL 1268 by Akzo Nobel.

The silicas used as Theological aids (D) are selected from the group consisting of modified pyrogenic, hydrophilic and hydrophobic, transparent silicas. Particular preference is given to using hydrophobic pyrogenic silicon dioxides whose agglomerates and aggregates have a chainlike structure and which may be prepared by flame hydrolysis of silicon tetrachloride in an oxyhydrogen flame. Preferably, they have a primary particle size of from 2 to 20 nm. They are sold, for example, by Degussa under the brand name Aerosil®. Particular preference is also given to using precipitated waterglasses, such as nanohectorites, which are sold, for example, by Südchemie under the brand name Optigel® or by Laporte under the brand name Laponite®. Further examples of suitable silicas are those known from the German patent application DE 199 24 172 A 1, page 3 lines 28 to 32. Yet another example of suitable hydrophilic, transparent silicas is Aerosil® 380 with an internal surface area of 380 $m^2/g$ (measured by the BET method in accordance with DIN 66131).

Preference is given to using wetting agents (E) as defined in Römpp Lexikon Lacke und Druckfarben, Georg Thieme Verlag, Stuttgart, New York, 1998 "wetting agents", page 409.

It is preferred to use wetting agents (E) selected from the group consisting of siloxanes, fluorine compounds, carboxylic monoesters, phosphates, polyacrylic acids and their copolymers, and polyurethanes. Preferably, polyurethanes are used.

Further suitable wetting agents (E) are described in Johan Bieleman, "Lackadditive", Wiley-VCH, Weinheim, N.Y., 1998, "4 Surface-active compounds", pages 69 to 100, especially "4.1.4 Chemical composition of wetting agents and dispersants", pages 87 to 92, and "4.1.8 Commercial products", page 100, or in the German patent application DE 199 24 171 A 1, page 2 line 63 to page 3 line 24.

Examples of highly suitable wetting agents (E) are the commercial products

Texaphor® 963 from Cognis (low molecular mass electroneutral salt of a polycarboxylic acid with amine derivatives, 50 percent in higher aromatics), Texaphor® 3112 from Cognis (high molecular mass polyurethane, 50 percent in xylene/butyl acetate 2:3), Disperbyk® 110 from Byk Chemie (anionic copolymer containing acidic groups, acid number: 53 mg KOH/g, 50 percent in methoxypropyl acetate/alkylbenzene 1:1), Disperbyk® 161 from Byk Chemie (high molecular mass polyurethane, amine number: 11 mg KOH/g, 30 percent in methoxypropyl acetate/butyl acetate 6:1), Disperbyk® 166 from Byk Chemie (high molecular mass polyurethane, amine number: 20 mg KOH/g, 30 percent in butyl acetate/methoxypropyl acetate 4:1), Efka® 4163 from Efka (high molecular mass polyurethane, amine number: 11 mg KOH/g, 30 percent in methoxypropyl acetate/butyl acetate 6:1), and Efka® 4047 from Efka (high molecular mass polyurethane, amine number: 10 to 20 mg KOH/g, 35 percent in butyl acetate/methoxypropyl acetate/secondary butanol).

The dual-cure mixtures of the invention further comprise at least one pigment (F).

The pigments (F) are preferably selected from the group consisting of customary and known, organic and inorganic, color and/or effect pigments, electrically conductive pigments, magnetically shielding pigments, and fluorescent pigments, and customary and known, organic and inorganic fillers and nanoparticles, other than the Theological aids (D).

These pigments (F) are used particularly when the dual-cure mixtures of the invention are intended for use as pigmented adhesives or sealing compounds and also coating materials, such as primer-surfacers, basecoat materials or solid-color topcoat materials.

Furthermore, the dual-cure mixtures of the invention may comprise additives (G), which may be used both in the pigmented and in the unpigmented dual-cure mixtures of the invention. Examples of suitable additives (G) are known from the German patent applications DE 199 24 170 A 1, column 13 line 6 to column 14 line 2, DE 199 24 171 A 1, page 8 line 65 to page 9 line 33, and DE 198 39 453 A 1, page 6 line 68 to page 7 line 6, with the exception of the wetting agents (E) and the transparent fillers based on silicon dioxide.

As additives (G) it is also possible to use compounds containing carbamate groups or carbamate-reactive functional groups and also reactive functional groups having at least one bond which can be activated with actinic radiation, as described in the German patent applications DE 199 61 926.3 and DE 100 41 634.9, both unpublished at the priority date of the present specification.

Not least, the dual-cure mixtures of the invention may comprise photoinitiator additives (G). Suitable photoinitiators (G) are those of the Norrish II type, whose mechanism of action is based on an intramolecular variant of the hydrogen abstraction reactions such as occur diversely in the case of photochemical reactions (by way of example, refer here to Römpp Chemie Lexikon, 9th, expanded and revised edition, Georg Thieme Verlag Stuttgart, Vol. 4, 1991) or other examples of cationic photoinitiators (by way of example, refer here to Römpp Lexikon Lacke und Druckfarben, Georg Thieme Verlag Stuttgart, 1998, pages 444 to 446), especially benzophenones, benzoins or benzoin ethers, or phosphine oxides. It is also possible to Make use, for example, of the products available commercially under the names Irgacure® 184, Irgacure® 1800 and Irgacure® 500 from Ciba Geigy, Genocure® MBF from Rahn and Lucirin® TPO from BASF AG.

The preparation of the dual-cure mixtures of the invention has no special features in terms of its method but instead takes place by the mixing of the above-described constituents. This may be done using mixing units such as stirred tanks, dissolvers, inline dissolvers, stirred mills, static mixers, toothed-ring dispersers or extruders. It is preferred to operate here in the absence of actinic radiation, in order to prevent damage to the dual-cure mixtures of the invention, especially as a result of premature crosslinking.

Depending on the intended use, the mixtures of the invention may be present in organic solvents as solutions and/or dispersions (nonaqueous dispersions, NADs) or as substantially or entirely solvent-free mixtures. The substantially or entirely solvent-free mixtures may be present in liquid forms (100% systems) or in powder form. Furthermore, the mixtures of the invention may be present as dispersions or solutions in water. Not least, the pulverulent mixtures of the invention may be in the form of what are known as powder slurries, in dispersions in water. Preferably, the mixtures of the invention are present as dispersions and/or solutions in organic solvents.

The dual-cure mixtures of the invention are outstandingly suitable as, or to prepare, dual-cure coating materials, adhesives and sealing compounds. The dual-cure coating materials of the invention are outstandingly suitable for the production of single-coat or multicoat, color and/or effect, electrically conductive, magnetically shielding or fluorescent coatings, such as primer-surfacer coats, basecoats or solid-color topcoats, or of single-coat or multicoat clearcoat systems. The dual-cure adhesives of the invention are outstandingly suitable for the production of adhesive films, and the dual-cure sealing compounds of the invention are outstandingly suitable for the production of seals.

Very particular advantages result when the dual-cure mixtures of the invention are used as dual-cure clearcoat materials to produce single-coat or multicoat clearcoat systems. In particular, the dual-cure clearcoat materials of the invention are used to produce multicoat color and/or effect paint systems in accordance with the wet-on-wet technique, in which a basecoat material, especially an aqueous basecoat material, is applied to the surface of a substrate and then the resultant basecoat film is dried, without being cured, and is overcoated with a clearcoat film. The two films are then cured together.

In terms of its method, the application of the dual-cure coating materials, adhesives and sealing compounds of the invention has no special features but may instead take place by any customary application method, such as spraying, knife coating, brushing, flow coating, dipping, trickling or rolling, for example. In the context of the coating materials of the invention it is preferred to employ spray application methods, unless the materials in question are powder coating materials, which are preferably applied by means of the fluidized bed techniques as known, for example, from the BASF Coatings AG company documents "Pulverlacke für Industrielle Anwendungen" [Powder coating materials for industrial applications], January 2000, or "Coatings Partner, Pulverlack Spezial" [Powder coatings special], 1/2000, or Römpp Lexikon Lacke und Druckfarben, Georg Thieme Verlag, Stuttgart, New York, 1998, pages 187 and 188, "Electrostatic powder spraying", "Electrostatic spraying" and "Electrostatic fluidized bath process".

Here too it is advisable to operate in the absence of actinic radiation in order to prevent premature crosslinking of the dual-cure coating materials, adhesives and sealing compounds of the invention.

Suitable substrates are all those whose surface is not damaged by the application of heat and actinic radiation in the course of the curing of the films present thereon. The substrates preferably consist of metals, plastics, wood, ceramic, stone, textile, fiber composites, leather, glass, glass fibers, glass wool and rock wool, mineral- and resin-bound building materials, such as plaster board and cement slabs or roof tiles, and also composites of these materials.

Accordingly, the coating materials, adhesives and sealing compounds of the invention are suitable for the coating, bonding and sealing of motor vehicle bodies or parts thereof, of the interior and exterior of motor vehicles, of buildings inside and out, of furniture, windows and doors, and, in the context of industrial coating, for the coating, bonding and sealing of small parts, such as nuts and bolts, hubcaps or wheel rims, of coils, containers, packaging, electrical components, such as motor windings or transformer windings, and of white goods, such as domestic appliances, boilers and radiators.

In the case of electrically conductive substrates it is possible to use primers which are produced in a customary and known manner from electrocoat materials. For this purpose both anodic and cathodic electrocoat materials are suitable, but especially the cathodic ones. Unfunctionalized and/or nonpolar plastics surfaces may be subjected prior to coating in a known manner to a pretreatment, such as with a plasma or by flaming, or may be provided with a water-based primer.

The curing of the applied dual-cure mixture of the invention also has no special features in terms of its method but instead takes place in accordance with the customary and known thermal methods, such as heating in a forced air oven or exposure to IR lamps. For curing with actinic radiation, suitable radiation sources are those such as high-pressure or low-pressure mercury vapor lamps, with or without lead doping in order to open up a radiation window of up to 405 nm, or electron beam sources. Further examples of suitable methods and apparatus for curing with actinic radiation are described in the German patent application DE 198 18 735 A 1, column 10 lines 31 to 61.

The resultant coatings of the invention, especially the single-coat or multicoat color and/or effect paint systems and clearcoats of the invention, are easy to produce and exhibit outstanding optical properties and very high light stability, chemical resistance, water resistance, condensation resistance, and weathering stability. In particular, they are free from turbidities and inhomogeneities. They exhibit very good reflow characteristics, outstanding intercoat adhesion between basecoat and clearcoat, and good to very good adhesion to customary and known automotive refinishes.

The adhesive films of the invention durably and thermally join a very wide variety of substrates to one another and possess high chemical and mechanical stability even in the case of extreme temperatures and/or temperature fluctuations.

Similarly, the seals of the invention seal the substrates durably, and exhibit high chemical and mechanical stability even in the case of extreme temperatures and/or temperature fluctuations and even in conjunction with exposure to aggressive chemicals.

In particular, however, the coatings of the invention possess high hardness and scratch resistance, and so may be used with particular advantage in the field of automotive coatings.

A further advantage of the novel dual-cure coating materials, adhesives and sealing compounds is that, even in the shadow zones of three-dimensional substrates of complex shape, such as vehicle bodies, radiators or electrical wound goods, and even without optimum—in particular, complete—illumination of the shadow zones with actinic radiation, they give coatings, adhesive films and seals whose profile of performance properties is at least equal to that of the coatings, adhesive films and seals outside of the shadow zones. As a result, the coatings, adhesive films and seals located in the shadow zones are no longer easily damaged by mechanical and/or chemical attack, such as may occur, for example, when further components of motor vehicles are installed into the coated bodies.

Accordingly, the primed or unprimed substrates commonly employed in the technological fields recited above and coated with at least one coating of the invention, bonded with at least one adhesive film of the invention and/or sealed with at least one seal of the invention combine a particularly advantageous profile of performance properties with a particularly long service life, so making them particularly attractive economically.

EXAMPLES

Preparation Example 1

The Preparation of a Hydroxyl-Containing Methacrylate Copolymer

A 4-liter reactor equipped with a stirrer, two dropping funnels as feeds for the monomer mixture and the initiator solution, a nitrogen inlet pipe, a thermometer and a reflux condenser was charged with 731 parts by weight of an aromatic hydrocarbon fraction having a boiling range of from 158 to 172° C. and this initial charge was heated to 140° C. Thereafter a monomer mixture of 183 parts by weight of n-butyl methacrylate, 458 parts by weight of ethylhexyl methacrylate, 214 parts by weight of styrene, 183 parts by weight of hydroxyethyl acrylate, 458 parts by weight of 4-hydroxybutyl acrylate and 31 parts by weight of acrylic acid was metered into the reactor at a uniform rate over the course of 4 hours and an initiator solution of 153 parts by weight of tert-butyl perethylhexanoate in 92 parts by weight of the above-described aromatic solvent was metered into the reactor at a uniform rate over the course of 4.5 hours. The addition of the monomer mixture and of the initiator solution was commenced simultaneously. After the end of the addition of the initiator, the reaction mixture was heated at 140° C. with stirring for two hours more and then cooled. The resulting resin solution had a solids content of 65% (forced air often; one hour; 130° C.).

Preparation Example 2

The Preparation of a Chloroformate-Functional Methacrylate Copolymer 700 parts by weight of the resin solution from preparation example 1 were diluted with 700 parts by weight of xylene in order to improve stirrability. The resulting mixture was introduced into an appropriate reactor. Subsequently, over the course of one hour, 400 parts by weight of phosgene were added to the resin solution at room temperature and with stirring. After a subsequent reaction period of 30 minutes, the degree of conversion was determined by means of IR spectroscopy. When this was done, hydroxyl groups were no longer detectable. The excess phosgene was separated off under reduced pressure. From the determination of the chlorine value, a conversion >90% was found.

Preparation Example 3

The Preparation of the Carbamate-Functional Methacrylate Copolymer (A)

1 450 parts by weight of the chloroformate-functional resin solution from preparation example 2 were introduced into an appropriate reactor. Subsequently, 61 parts by weight of ammonia were introduced into the resin solution at room temperature, with ammonium chloride being precipitated.

The resulting resin solution was admixed in succession with 500 parts by weight of water, 400 parts by weight of ethanol and 500 parts by weight of pentyl acetate in order to dissolve the precipitated ammonium chloride and to bring about phase separation. The resulting mixture was stirred at room temperature for one hour and then left to stand in order for phase separation to take place. After it had taken place, the aqueous phase was separated off and the organic phase was dried over sodium chloride.

NMR analysis revealed that more than 80% of the chloroformate groups had been converted into carbamate groups. The resulting solution of the polyacrylate resin of the invention had a solids content of 68.6% by weight (forced air oven; one hour; 130° C.), a viscosity of 8.4 dPas (original) and a viscosity of 5.6 dPas in 65% dilution in solvent naphtha.

Example 1

The Preparation of an Inventive Clearcoat Material

The inventive clearcoat material was prepared by mixing and homogenizing the following constituents:

- 222 parts by weight of the methacrylate copolymer solution (A) from preparation example 3,
- 42.2 parts by weight of Setamine® XL 1268 [urea-modified melamine resin (Resimene® 755 from Monsanto, 80 percent in isobutanol) from Akzo Nobel; amount of Theological aid (B) present: 2.4% by weight],
- 30 parts by weight of pentaerythritol triacrylate (Sartomer® 444D),
- 5.2 parts by weight of Tinuvin® 400 (commercial UV absorber from Ciba Specialty Chemicals, Inc.),
- 2.6 parts by weight of Tinuvin® 123 (commercial reversible free-radical scavenger, sterically hindered amine (HALS) from Ciba Specialty Chemicals, Inc.),
- 6.8 parts by weight of Nacure® 5528 (commercial catalyst (amine-blocked sulfonic acid derivative) from King),
- 6.0 parts by weight of a five percent strength solution of a commercial leveling agent based on polydimethylsiloxane in xylene,
- 0.8 part by weight of Byk® 306 (commercial additive from Byk Chemie),
- 4.0 parts by weight of Irgacure® 184 (commercial photoinitiator from Ciba Specialty Chemicals, Inc.),
- 1.0 part by weight of Lucirin® TPO (commercial photoinitiator from BASF Aktiengesellschaft),
- 31 parts by weight of ethylhexanol,
- 15 parts by weight of n-butanol,
- 3 parts by weight of pine oil, 85 percent, and
- 20 parts by weight of butyl diglycol.

Using the mixture of the abovementioned solvents, the dual-cure clearcoat material was adjusted to a viscosity of 30 seconds in the DIN 4 flow cup. It then had a solids content of 55.3% by weight (one hour, forced air oven/130° C.).

Example 2

The Production of an Inventive Multicoat Color Paint System

To produce the multicoat system, steel test panels coated with an electrocoat in a dry film thickness of from 18 to 22 µm were coated with a waterborne primer-surfacer. The resultant waterborne primer-surfacer film was baked at 160° C. for 20 minutes to give a primer-surfacer coat with a dry film product thickness of from 35 to 40 µm. The primer-surfacer coat was subsequently coated with a black aqueous basecoat material from BASF Coatings AG in a film thickness of from 12 to 15 µm. The resultant aqueous basecoat films were flashed off at 80° C. for 10 minutes. Thereafter, the dual-cure clearcoat material from example 1 was applied pneumatically using a gravity-feed cup gun in one crosspass in a film thickness of from 40 to 45 µm. Subsequently, the clearcoat films were flashed off at room temperature for 5 minutes and at 100° C. for 5 minutes, exposed to UV radiation (dose: 3,000 mJ/cm$^2$), and then baked together with the aqueous basecoat films in a forced air oven at a panel temperature of 140° C. for 20 minutes.

For the wetting test, relatively thin clearcoat films were applied and baked in the manner described above. The test revealed that very good wetting was present even with a film thickness below 20 µm.

For the leveling test, the clearcoat material was electrostatically applied vertically and horizontally to the test panels. This was done using an Eco-bell with direct charging. The leveling was assessed visually as being particularly good (very smooth surface). This is underscored by the measurement of the wave scan values, with which the skilled worker is familiar:

long wave/short wave at 40 um, horizontal application: 8.3/4 long wave/short wave at 40 µm, vertical application: 12.1/5.2

(instrument: Byk/Gardner—Wave scan plus).

In order to test for the tendency to run, customary and known perforated metal sheets with diagonal rows of holes were used instead of the test panels. The clearcoat material was applied electrostatically in a film thickness of <20 µm to 65 µm. This was done using an Eco-bell with direct charging. Basecoat and clearcoat were baked in the vertical position. Initial signs of runs occurred only at clearcoat thicknesses >50 µm; the runs reached a length of 1 cm only at 52 µm.

The resultant multicoat paint system was highly brilliant and had a gloss (20°) to DIN 67530 of 90.

The scratch resistance was determined with the aid of the sand test (cf. German patent application DE 198 39 453 A 1, page 9 lines 1 to 63) using the metal test panels described above. Following damage a loss of gloss by only 11.5 units (20°) to 79.5 was found, which underlined the high scratch resistance. The gloss rose after two hours at 40° C. to 80.2 and after two hours at 60° C. to 81.6, which demonstrated the very good reflow characteristics.

Furthermore, the scratch resistance was assessed with the aid of the brush test (cf. the German patent application DE 198 39 453 A 1, page 9 lines 17 to 63) using the metal test panels described above. Following damage, a loss of gloss by only 4.8 units (200) to 85.2 was found, which underlined the high scratch resistance. The gloss rose after two hours at 40° C. to 85.9 and after two hours at 60° C. to 86.5, which underlined the very good reflow characteristics.

The chemical resistance was determined in accordance with BART.

The BART (BASF ACID RESISTANCE TEST) was used to determine the resistance of film surfaces to acids, alkalis and water drops. After baking, the coating was exposed to further temperature loads in a gradient oven (30 min at 40° C., 50° C., 60° C. and 70° C.). Beforehand, the test substances (1%, 10% and 36% strength sulfuric acid; 5% sulfurous acid, 10% hydrochloric acid, 5% sodium hydroxide solution, DI (i.e., deionized) water (1, 2, 3 or 4 drops)) were applied in a defined manner using a volumetric pipette. Following exposure to the substances, they were removed under running water and the damage was assessed visually after 24 h in accordance with a specified scale:

| Rating | Appearance |
| --- | --- |
| 0 | no defect |
| 1 | slight marking |
| 2 | marking/matting/no softening |
| 3 | marking/matting/color change/softening |
| 4 | cracks/incipient etching |
| 5 | clearcoat removed |

Each individual mark (spot) was evaluated and the result was noted for each coating in an appropriate form (e.g., rating totals for one temperature).

The results of the tests are given in the table.

The BART underlines the extraordinary acid resistance of the multicoat paint system of the invention and of the clearcoat of the invention.

TABLE

| The BART acid resistance of the inventive multicoat paint system | | | | |
| --- | --- | --- | --- | --- |
| Test substance | 40° C. | 50° C. | 60° C. | 70° C. |
| 1% sulfuric acid | 0 | 0 | 0 | 1 |
| 10% sulfuric acid | 0 | 0 | 0 | 2 |
| 36% sulfuric acid | 0 | 0 | 0.5 | 3 |
| 10% hydrochloric acid | 0 | 0 | 0 | 0 |
| 5% sulfurous acid | 0 | 0 | 0 | 1 |
| 5% sodium hydroxide solution | 0 | 0 | 0 | 0 |
| DI water 1 | 0 | 0 | 0 | 0 |
| DI water 2 | 0 | 0 | 0 | 0 |
| DI water 3 | 0 | 0 | 0 | 0 |
| DI water 4 | 0 | 0 | 0 | 0 |
| Total | 0 | 0 | 0.5 | 7 |

What is claimed is:

1. A dual-cure mixture curable thermally and with actinic radiation and containing carbamate and/or allophanate groups, comprising
   (A) at least one constituent selected from the group consisting of
      (A1) at least one of a compound, an oligomer and a polymer, wherein the compound, the oligomer, and the polymer each contain at least one allophanate group, at least one carbamate group, or at least one carbamate group and at least one allophanate group, and
      (A2) at least one of a compound, an oligomer and a polymer, wherein the compound, the oligomer, and the polymer each contain at least one allophanate group, at least one carbamate group, and at least one carbamate group and at least one allophanate group, and each additionally contain at least one allophanate-reactive functional group, at least one carbamate-reactive functional group, or at least one carbamate-reactive functional group and at least one allophanate-reactive functional group,
   which are substantially or entirely free from reactive functional groups that contain at least one bond that can be activated with actinic radiation,
   (C) at least one constituent containing on average per molecule at least one reactive functional group having at least one bond that can be activated with actinic radiation;
      with the proviso that if there are no constituents (A2), the dual-cure mixture further comprises
   (B) at least one constituent selected from the group consisting of at least one compound, at least one oligomer and at least one polymer wherein the compound, the oligomer, and the polymer each contain at least one allophanate-reactive functional group, at least one carbamate-reactive functional group, or at least one carbamate-reactive functional group and at least one allophanate-reactive functional group, and
   (D) optionally, at least one rheological aid.

2. The dual-cure mixture of claim 1, wherein the allophanate-reactive functional group and the carbamate-reactive functional group are each selected from the group consisting of N-methylol groups and N-methylol ether groups.

3. The dual-cure mixture of claim 1, wherein the bonds that can be activated with actinic radiation are selected from the group consisting of carbon-hydrogen single bonds, carbon-carbon single bonds, carbon-oxygen single bonds, carbon-nitrogen single bonds, carbon-phosphorus single bonds, carbon-silicon single bonds, carbon-carbon double bonds, carbon-oxygen double bonds, carbon-nitrogen double bonds, carbon-phosphorus double bonds, and carbon-silicon double bonds.

4. The dual-cure mixture as claimed in claim 3, wherein the bonds that can be activated with actinic radiation are present in at least one of a (meth)acrylate group, an ethacrylate group, a crotonate group, a cinnamate group, a vinyl ether group, a vinyl ester group, an ethenylarylene group, a dicyclopentadienyl group, a norbornenyl group, an isoprenyl group, a isopropenyl group, an allyl group, a butenyl group, an ethenylarylene ether group, a dicyclopentadienyl ether group, a norbornenyl ether group, an isoprenyl ether group, a isopropenyl ether group, an allyl ether group, a butenyl ether group, an ethenylarylene ester group, a dicyclopentadienyl ester group, a norbornenyl ester group, an isoprenyl ester group, an isopropenyl ester group, an allyl ester group, and a butenyl ester group.

5. The dual-cure mixture of claim 4, wherein the bonds that can be activated with actinic radiation are present in a (meth)acrylate group.

6. The dual-cure mixture of claim 1, wherein the oligomers and the polymers are each at least one of an addition (co)polymer of at least one ethylenically unsaturated monomer, a polyaddition resin and a polycondensation resin, wherein the addition (co)polymer is at least one of a random (co)polymer, an alternating (co)polymer, and a block (co)polymer, and wherein the addition (co)polymer is at least one of linear, branched, and comb.

7. The dual-cure mixture of claim 6, wherein the addition (co)polymer is selected from the group consisting of (meth)acrylate copolymers and polyvinyl esters, and the polyaddition resin and the polycondensation resin are each selected from the group consisting of polyesters, alkyds, polyurethanes, polylactones, polycarbonates, polyethers, epoxy resin-amine adducts, polyureas, polyamides and polyimides.

8. The dual-cure mixture of claim 1, wherein the constituent (B) is selected from the group consisting of amino resins.

9. The dual-cure mixture of claim 1, wherein the constituents (C) is selected from the group consisting of reactive diluents curable with actinic radiation, (meth)acryloyl-functional (meth)acrylic copolymers, polyether (meth)acrylates, polyester (meth)acrylates, unsaturated polyesters, epoxy (meth)acrylates, urethane (meth)acrylates, amino (meth) acrylates, melamine (meth)acrylates, silicone (meth)acrylates, and combinations thereof.

10. The dual-cure mixture of claim 9, wherein the constituents (C) is selected from the group consisting of pentaerythritol triacrylate and dipentaerythritol pentaacrylate.

11. The dual-cure mixture of claim 1, further comprising the at least one rheological aid selected from the group consisting of silicas and urea derivatives, wherein the urea derivatives are prepared by reacting
   A) at least one of
      i) at least one amine and
      ii) water with at least one isocyanate
   in the presence of
   B) at least one of
      i) at least one constituent selected from the group consisting of
         (a) at least one of an oligomer and a polymer, wherein the oligomer and the polymer each contain at least one allophanate group, at least one carbamate group, or at least one carbamate group and at least one allophanate group, and
         (b) at least one of an oligomer and a polymer, wherein the oligomer and the polymer each contain at least one allophanate group, at least one carbamate group, and at least one carbamate group and at least one allophanate group, and each additionally contain at least one allophanate-reactive functional group, at least one carbamate-reactive functional group, or at least one carbamate-reactive functional group and at least one allophanate-reactive functional group,
      which are substantially or entirely free from reactive functional groups that contain at least one bond that can be activated with actinic radiation, and
      ii) at least one amino resin.

12. The dual-cure mixture of claim 1, further comprising at least one wetting agent.

13. The dual-cure mixture of claim 12, wherein the at least one wetting agent is selected from the group consisting of siloxanes, fluorine compounds, carboxylic monoesters, phosphates, polyacrylic acids, copolymers of polycarboxylic acids, and polyurethanes.

14. The dual-cure mixture of claim 1, further comprising at least one pigment selected from the group consisting of organic pigments, inorganic pigments, color and/or effect pigments, electrically conductive pigments, magnetically shielding pigments, fluorescent pigments, organic fillers, inorganic fillers, and nanoparticles, wherein the pigment is different from the at least one rheological aid.

15. The dual-cure mixture of claim 1, further comprising at least one photoinitiator.

16. A process for preparing the dual-cure mixture of claim 1 comprising mixing the constituents, wherein if the rheological aid is included, the rheological aid is prepared by a process comprising reacting
   A) at least one of
      i) at least one amine and
      ii) water with at least one isocyanate
   in the presence of
   B) at least one of
      i) at least one constituent selected from the group consisting of
         (a) at least one of an oligomer and a polymer, wherein the oligomer and the polymer each contain at least one allophanate group, at least one carbamate group, or at least one carbamate group and at least one allophanate group, and
         (b) at least one of an oligomer and a polymer, wherein the oligomer and the polymer each contain at least one allophanate group, at least one carbamate group, and at least one carbamate group and at least one allophanate group, and each additionally contain at least one allophanate-reactive functional group, at least one carbamate-reactive functional group, or at least one carbamate-reactive functional group and at least one allophanate-reactive functional group,
      which are substantially or entirely free from reactive functional groups that contain at least one bond that can be activated with actinic radiation, and
      ii) at least one amino resin.

17. The dual-cure mixture of claim 1 wherein the dual-cure mixture is one of a coating material, an adhesive or a sealing compound.

18. The dual-cure mixture of claim 17, wherein the coating material is a clearcoat material.

19. A method comprising applying the dual-cure mixture of claim 17 to one of a motor vehicle body, a motor vehicle part, a building, furniture, a window, a door, a part, a coil, a container, a package, an electrical component, or a white good.

* * * * *